(12) United States Patent
Klauer et al.

(10) Patent No.: US 10,604,676 B2
(45) Date of Patent: Mar. 31, 2020

(54) USE OF A COATING AGENT COMPOSITION FOR LINING CONTAINERS

(71) Applicant: Akzo Nobel Coatings International B.V., Arnhem (NL)

(72) Inventors: Jens Klauer, Hamburg (DE); Klaus Buck, Geestland/Langen (DE); Dirk Seeger, Oldenburg (DE); Christoph Piecha, Stadland (DE)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/770,251

(22) PCT Filed: Oct. 21, 2016

(86) PCT No.: PCT/EP2016/075326
§ 371 (c)(1),
(2) Date: Apr. 23, 2018

(87) PCT Pub. No.: WO2017/072033
PCT Pub. Date: May 4, 2017

(65) Prior Publication Data
US 2018/0312721 A1   Nov. 1, 2018

(30) Foreign Application Priority Data

Oct. 30, 2015   (EP) .................................... 15192282

(51) Int. Cl.
| | | |
|---|---|---|
| *B29C 65/00* | (2006.01) |
| *C09D 175/08* | (2006.01) |
| *C08G 18/76* | (2006.01) |
| *C08G 18/48* | (2006.01) |
| *C08G 18/40* | (2006.01) |
| *C08G 18/08* | (2006.01) |
| *C08G 18/66* | (2006.01) |
| *C08G 18/10* | (2006.01) |
| *C08G 18/22* | (2006.01) |
| *C08G 18/32* | (2006.01) |
| *B65D 90/04* | (2006.01) |
| *C08L 83/04* | (2006.01) |
| *B29C 63/00* | (2006.01) |
| *C09D 175/04* | (2006.01) |

(52) U.S. Cl.
CPC ........... *C09D 175/08* (2013.01); *B65D 90/04* (2013.01); *C08G 18/0876* (2013.01); *C08G 18/10* (2013.01); *C08G 18/222* (2013.01); *C08G 18/324* (2013.01); *C08G 18/409* (2013.01); *C08G 18/4812* (2013.01); *C08G 18/4825* (2013.01); *C08G 18/4829* (2013.01); *C08G 18/4845* (2013.01); *C08G 18/6681* (2013.01); *C08G 18/7671* (2013.01); *B29C 63/0017* (2013.01); *C08G 2390/40* (2013.01); *C08L 83/04* (2013.01); *C09D 175/04* (2013.01)

(58) Field of Classification Search
CPC .... B65D 90/04; C09D 175/04; C09D 175/08; B29C 63/0017
USPC ......................................................... 165/701
See application file for complete search history.

(56) References Cited

U.S. PATENT DOCUMENTS

| | | |
|---|---|---|
| 5,621,043 A | 4/1997 | Croft |
| 2013/0116379 A1 | 5/2013 | Wamprecht |

FOREIGN PATENT DOCUMENTS

| | | |
|---|---|---|
| DE | 10 2010 031682 A1 | 1/2012 |
| EP | 2 695 899 A1 | 2/2014 |
| WO | 97/35932 A1 | 10/1997 |

*Primary Examiner* — Mark A Osele
*Assistant Examiner* — Nickolas R Harm
(74) *Attorney, Agent, or Firm* — McDonnell Boehnen Hulbert & Berghoff LLP

(57) ABSTRACT

The invention relates to the use of a coating agent composition for lining containers as well as a method for cleaning a container that has a corresponding lining and in which at least one product has been stored and/or transported.

15 Claims, No Drawings

USE OF A COATING AGENT COMPOSITION FOR LINING CONTAINERS

This application is the U.S. national phase under 35 U.S.C. § 371 of international application PCT/EP2016/075326, filed Oct. 21, 2016, which claims priority to European application 15192282.0, filed Oct. 30, 2015.

FIELD OF THE INVENTION

The present invention relates to the use of a specific coating agent composition for lining containers, especially containers for transporting and/or storing chemical products, such as tanks, tankers, or tank cars, for example. The coatings produced by means of the coating composition on the internal surface of containers have particularly high chemical resistance and also easy peelability from the coated surface.

PRIOR ART

In many segments of industry, for example the bulk chemical industry, there is widespread use of containers for the storage and/or transport of a wide variety of products, such as for example chemical products. Examples of such containers include tanks, tankers, and tank cars. Of course, from time to time, the containers must be fully cleaned from the inside, in order to remove possibly degraded product residues which may contaminate newly introduced batches of the product. A change in the type of product to be introduced as well of course necessitates such cleaning.

Cleaning the internal surface of such containers often involves a lot of effort and time. Depending on the product introduced and the time of storage or of transport in the container, solidified and aged product residues may be deposited on the internal container surfaces. Such residues may strongly adhere to said internal surfaces, thereby necessitating complex manual mechanical cleaning and/or the high-pressure water jetting of the containers.

PROBLEM AND SOLUTION

The present invention therefore addresses the problem of countering the disadvantages of the prior art and of making it more economical and easier to implement the internal cleaning of containers, more particularly of tanks, tankers, and tank cars.

It has been found that this problem can be solved by the use of a coating agent composition comprising at least one binder component A and at least one curing component B, the binder component A comprising A1 at least one polyol component comprising at least one poly(oxyalkylene) glycol,
A2 at least one aromatic diamine,
A3 silicone elastomer particles, and
A4 at least one polyurethane urea,
and the curing component B comprising
B1 at least one urethane group-containing component comprising nonblocked isocyanate groups and
B2 at least one aromatic diisocyanate from methylenedi (phenyl isocyanate),
the curing component B having an amount of nonblocked isocyanate groups of 10 to 30 wt %,
and
the solids content of the coating agent composition being greater than 95 wt %,
for lining containers.

This novel use is a subject of the present invention. A further subject of the present invention is a container lined with said coating agent composition, and a further subject is a method for lining containers with such coating agent composition.

Through the use of the coating agent composition for lining containers, products introduced into the containers, chemical products for example, are denied contact with the internal container surface itself.

This prevents the possible direct deposition of products or product residues on this internal surface, in the form of solidified and possibly aged deposits, for example, which may remain after the products have been drained off and whose removal from the internal surface may be very costly and inconvenient. Instead, such residues remain on the surface of the coating produced using the coating agent composition, and can be detached from the internal surface of the container easily and cleanly, in particular by cutting and subsequent mechanical peeling, and can be removed from the container together with the product residues.

DETAILED DESCRIPTION

The coating agent compositions for use in accordance with the invention comprise at least one binder component A and one curing component B. In spite of the selection of the terms "binder component A" and "curing component B", the general term "binder" for the purposes of the present invention and in agreement with the definition having general validity represents the nonvolatile fraction (i.e., solids content) of the coating agent, without pigments and fillers. The binders therefore also include, for example, crosslinking agents, as are present in the curing component B, for example, and additives, such as wetting agents and/or dispersants, defoamers, flow control additives, rheological additives, or catalysts, for example, provided they are not volatile under the conditions for determining the binder content. The binder content of a coating agent is determined by the Soxhlet extraction method (ISO 13944:2012; November 2012). The terms "binder component A" and "curing component B" are used purely for the sake of clarity.

The solids content of the coating agent composition is determined according to ISO 3251:2008 by drying 1 g of the coating agent composition at 105° C. for 60 minutes. The nonvolatile fraction which remains after drying is expressed in terms of the initial mass, and indicates the percentage solids content of the coating agent composition.

In accordance with the invention the solids content (or simply solids) of the coating agent compositions is greater than 95 wt %. The solids content is preferably greater than 97 wt %, more preferably greater than 98 wt %, and very preferably greater than 99 wt %.

The binder fraction in the solids content of the coating agent composition of the invention is preferably 80 to 98 wt %, more preferably 85 to 95 wt %. If the binder fraction of the solids content is 100 wt %, this means that the solids content includes neither pigments nor fillers.

The hydroxyl number (OH number) of the polymers used is determined according to DIN EN ISO 4629.

The isocyanate group content of the polyisocyanates used is determined according to DIN EN ISO 11909.

Statements of the molecular weight of the polymers are weight-average molecular weights. The weight-average molecular weight is determined according to DIN 55672-1: 2007-08.

Unless otherwise specified herein, all references for standards are to the version currently valid on the filing date of the present invention or, if there is no longer any currently valid version at that point in time, the most recently valid version.

All percentage figures and figures for physical parameters in relation to the stated components A and B and to the components comprised therein are based—as is usual—on the respective component without organic solvent fraction, unless expressly stated otherwise. Where, for example, a coating agent composition of the invention contains 10 wt % of a commercial formulation of a polyether polyol that comprises the polyether polyol as a 50 weight percent strength solution in a solvent, this means that the coating agent composition of the invention contains 5 wt % of the polyether polyol (i.e., 50 wt % of 10 wt %). The solvent introduced by way of the commercial formulation is therefore not a percentage constituent of the polyether polyol, but instead forms part of the solvent fraction.

Binder Component A

The coating agent compositions for use in accordance with the invention comprise at least one, preferably exactly one, binder component A, with the binder component A comprising at least one polyol component A1 comprising at least one poly(oxyalkylene) glycol, at least one aromatic diamine A2, silicone elastomer particles A3, and at least one polyurethane urea A4.

Polyol Component A1

The coating agent compositions for use in accordance with the invention comprise, in the binder component A, at least one polyol component A1 comprising at least one poly(oxyalkylene) glycol. By definition a component is termed a polyol component if the molecules it contains comprise on average more than one OH group. Preference is given to using poly(oxyalkylene) glycols from ethylene oxide and/or propylene oxide. The polyol component A1 preferably comprises at least one poly(oxyalkylene) glycol from ethylene oxide and/or propylene oxide.

In one particularly preferred embodiment the polyol component A1 comprises at least one propoxylated polyethylene glycol A1.1, at least one polypropylene glycol A1.2, and at least one propoxylated trimethylolpropane A1.3. In this particularly preferred embodiment the propoxylated polyethylene glycol A1.1 has a weight-average molecular weight $M_w$ of between 6000 and 7000 g/mol, and the OH number of the polypropylene glycol A1.2 is between 25 and 35 mg KOH/g.

In the coating agent compositions for use in accordance with the invention, the polyol component A1 is present preferably in an amount of 8 to 76 wt %, more preferably in an amount of 20 to 70 wt %, based on the total weight of the coating agent composition.

Aromatic Diamine A2

The coating agent compositions for use in accordance with the invention comprise, in the binder component A, at least one aromatic diamine A2.

The aromatic diamine A2 is preferably a monocyclic aromatic. The two amine groups of the aromatic diamine A2 are preferably each bonded directly to the aromatic. Preferably one, two, three, or four of the remaining substitution positions of the monocyclic aromatic, more preferably exactly three of the remaining substitution positions, carry alkyl radicals. In one particularly preferred embodiment the alkyl radicals are methyl radicals and/or ethyl radicals and, in one especially preferred embodiment, the aromatic diamine A2 is 3,5-diethyltoluene-2,4-diamine and/or 3,5-diethyltoluene-2,6-diamine. Suitable aromatic diamines A2 are available from the company Aldrich, for example.

The aromatic diamine A2 is present in the coating agent compositions for use in accordance with the invention preferably in an amount of 1 to 8 wt %, more preferably in an amount of 3 to 5 wt %, based on the total weight of the coating agent composition.

The at least one aromatic diamine A2 is used as a crosslinker in the coating agent compositions of the invention. A reduction in the weight-percentage fraction of the aromatic diamine A2 among the total weight of the coating agent composition leads to a deterioration in the tear resistance of the resulting coating. Increasing the weight-percentage fraction of the aromatic diamine A2 among the total weight of the coating agent composition leads to a reduced chemical resistance of the resulting coating and also to impaired processing properties of the coating agent composition.

Silicone Elastomer Particles A3

In the binder component A, furthermore, the coating agent compositions for use in accordance with the invention comprise silicone elastomer particles A3. For the purposes of this invention, the silicone elastomer particles are included among the binders. The silicone elastomer particles A3 for use in accordance with the invention are preferably core-shell particles. According to the IUPAC definition, core-shell particles contain at least two phases. Core-shell systems are composed of an internal part, known as the core, and an external part, known as the shell.

The silicone elastomer particles A3 preferably possess a core comprising crosslinked polysiloxane and a shell which has reactive groups. The core is preferably a crosslinked polyorganosiloxane which has repeating dialkylsiloxane units, the expression "alkyl" denoting a $C_1$ to $C_{18}$ radical. The core preferably comprises repeating dimethylsiloxane units. The reactive groups of the shell preferably contain epoxide groups, ethylenically unsaturated groups and/or hydroxyl groups. With particular preference the reactive groups of the shell contain hydroxyl groups.

The silicone elastomer particles A3 are present in the coating agent compositions for use in accordance with the invention preferably in an amount of 0.2 to 9 wt %, more preferably in an amount of 3 to 7 wt %, based on the total weight of the coating agent composition.

Reducing the weight-percentage fraction of the silicone elastomer particles A3 among the total weight of the coating agent composition leads to an impaired chemical resistance of the resulting coatings.

The silicone elastomer particles A3 preferably have a volume particle size with a $D_{50}$ in the range from 0.05 to 5 μm, preferably from 0.1 to 3 μm. The particle size of silicone elastomer particles can be determined in general by static light scattering (laser diffraction) according to ISO 13320: 2009-10.

The silicone elastomer particles A3 are more preferably dispersed in a polyol component A1 or in a portion of this polyol component A1. It is especially preferred if propoxylated trimethylolpropane A1.3 is used as dispersing medium. In the case of this especially preferred embodiment, the dispersion comprises between 20 and 60 wt %, preferably between 35 and 45 wt %, of dispersed silicone elastomer particles, based on the total weight of the dispersion.

Suitable commercially available products of this particularly preferred embodiment are available from Evonik under the Albidur® product line.

Polyurethane Urea A4

As a further constituent, the coating agent compositions for use in accordance with the invention comprise at least one polyurethane urea A4 in the binder component A.

The polyurethane urea A4 is present in the coating agent compositions for use in accordance with the invention, preferably in an amount of 0.5 to 11 wt %, more preferably in an amount of 3 to 8 wt %, based on the total weight of the coating agent composition.

The use of a polyurethane urea A4 in the coating agent compositions for use in accordance with the invention is vital to the chemical resistance of the resulting coating. Reducing the weight-percentage amount of polyurethane urea in the coating agent composition leads to reduced chemical resistance on the part of the coating produced in accordance with the invention, possibly resulting in detachment of the coatings from the substrate.

In one especially preferred embodiment, formulations are employed in which the polyurethane urea A4 is present in a polyol component A1 or in a portion of this polyol component A1. In that case it is especially preferred if the polyurethane urea A4 is present in the polypropylene glycol A1.2. In the case of this especially preferred embodiment, the mixture of polypropylene glycol A1.2 and polyurethane urea A4 contains between 20 and 40 wt %, preferably between 18 and 22 wt %, of polyurethane urea A4, based on the total weight of this formulation.

Suitable commercially available products of this especially preferred embodiment of A4 are available under the Desmophen® product line from Bayer Material Science.

Curing Component B

The coating agent compositions for use in accordance with the invention comprise at least one curing component B, the curing component B comprising at least one urethane group-containing component comprising nonblocked isocyanate groups B1, and also at least one aromatic diisocyanate from methylenedi(phenyl isocyanate) B2. In accordance with the invention the curing component B has a level of nonblocked isocyanate groups of 10 to 30 wt %, preferably of 15 to 30 wt %.

The curing component B is present in the coating agent compositions for use in accordance with the invention preferably in an amount of 20 to 40 wt %, more preferably in an amount of 24 to 32 wt %, based on the total weight of the coating agent composition.

The urethane group-containing component B1 of the curing agent mixture B is preferably prepared by reaction of a hydroxyl group-containing component B1.1 with an isocyanate component B1.2. The hydroxyl group-containing component B1.1 is preferably at least one $C_1$-$C_6$-alkoxylated poly(oxyalkylene) glycol. Preference is given to using alkoxylated poly(oxyalkylene) glycols from ethylene oxide and/or propylene oxide. More preferably component B1.1 is an ethoxylated polypropylene glycol. Suitable commercially available products are available from Bayer Material Science under the Desmophen® product line.

The isocyanate component B1.2 for preparing the urethane group-containing compound B1 is preferably an aromatic diisocyanate, preferably an aromatic diisocyanate from methylenedi(phenyl isocyanate).

In the preparation of the urethane group-containing compound B1 containing free isocyanate groups, the ratio of the OH groups of component B1.1 to the NCO groups of component B1.2 is preferably selected such that for the OH:NCO ratio it is the case that OH<NCO. In this case the ratio of OH:NCO is preferably in a range from 1:1.05 to 1:2.05. More preferably the OH:NCO ratio is 1:2. The excess of NCO groups in relation to the OH groups means that the urethane group-containing component B1 carries nonblocked NCO groups, which are available for the later crosslinking reactions with the binder component A. It is particularly preferred if all OH groups of the component B1.1 have reacted with the isocyanate groups of component B1.2 to form urethane groups, and so the urethane group-containing component B1 has no OH groups.

The urethane group-containing compound B1 preferably has a weight-average molecular weight $M_w$ of 4000 to 6000 g/mol, more preferably of 2000 to 3000 g/mol.

Used with very particular preference for preparing the urethane group-containing component B1, as isocyanate component B1.2, is the aromatic diisocyanate from methylenedi(phenyl isocyanate) B2 which is present in accordance with the invention in the curing component B.

In accordance with the invention the curing component B, besides the component B1, comprises at least one aromatic diisocyanate from methylenedi(phenyl isocyanate) B2. The aromatic diisocyanate B2 is preferably 2,2'-diphenylmethane diisocyanate or 2,4'-diphenylmethane diisocyanate, or a combination thereof.

The curing component B preferably comprises 30 to 80 wt %, more preferably 40 to 70 wt %, of the aromatic diisocyanate from methylenedi(phenyl isocyanate) B2.

The curing component B may be prepared by first synthesizing the urethane group-containing component B1. In the next step, the aromatic diisocyanate from methylenedi (phenyl isocyanate) B2 is admixed to the component B1 in order thereby to prepare the curing component B.

In the especially preferred embodiment in which component B1.2 is identical to component B2, the preparation of the curing component B is accomplished by direct mixing of the hydroxyl group-containing compound B1.1 with the aromatic diisocyanate from methylenedi(phenyl isocyanate) B2. On the mixing of the components, there is reaction of the OH groups with the NCO groups to form the urethane group-containing component B1 comprising nonblocked isocyanate groups. In this especially preferred embodiment, the initial ratio of the OH groups of component B1.1 to the NCO groups of component B2 is in a range from 0.5:4 to 1.5:4, preferably 0.8:4 to 1.2:4.

Based on the coating agent compositions for use in accordance with the invention it is preferred, furthermore, for the ratio of the hydroxyl groups of all the components of the binder component A to the isocyanate groups of the curing component B, OH:NCO, to be in a range from 1:0.9 to 1:1.4, the ratio more preferably being 1:1.1.

If, however, the excess of isocyanate groups exceeds the ratio described above, there is a decrease in the removability of the resulting coating, as a result of an increase in the adhesion to the substrate.

Further Constituents of the Coating Agent Composition

Pigments and Fillers

Pigments, according to DIN EN ISO 4618, are colorants which consist of fine particles that are insoluble in the liquid phase of the coating material and are used on account of their optical, protective and/or decorative qualities. The term "colorant" here includes black or white colorants. Preferred pigments are coloring pigments and/or effect pigments and anticorrosion pigments. Effect pigments are those which impart an optical effect deriving in particular from reflection of light. Typical effect pigments for the purposes of this specification are pigments having a high chemical and thermal resistance.

Fillers, on the other hand, according to DIN EN ISO 4618, are materials in granular or powder form which are insoluble in the liquid phase of a coating material and are used in order to achieve or influence defined physical qualities. Since there may be instances of overlap between pigments and fillers in terms of their intended use, the refractive index is often employed to distinguish between them. For fillers, the refractive index is below 1.7, meaning that this class of product does not achieve any notable scattering and hiding power. In the context of the present invention, however, there is no absolute need for any distinction.

The coating agent compositions for use in accordance with the invention preferably employ pigments in order to color the binder component A and the curing component B and hence to have a visual check on mixing at the application stage. In the selection of the pigments, preference is given to account being taken of their chemical resistance relative to general chemical products.

Preferred pigments are based on a (mono)azo moiety (—N=N—) and preferably have a yellow hue. For this purpose, for example, the pigment C.I. Pigment Yellow 74 can be used. Particularly preferred pigments have a black hue and are based on organic carbon black. For this purpose use may be made, for example, of the pigment C.I. Pigment Black 7. Further typical pigments which can be used in the coating agent composition for use in accordance with the invention are white pigments such as titanium dioxide in the rutile form, for example, or copper phthalocyanine-based blue pigments.

Used preferably as a filler is low-alkaline borosilicate glass in the form of hollow microbeads. The preferential use of hollow microbeads in the coating compositions used in accordance with the invention contributes to an improvement in the visibility of blade cuts. Furthermore, talc, mica, barium sulfate, silicate-based components, and quaternary alkylammonium clay may be used as fillers in the coating agent composition for use in accordance with the invention.

Other Constituents

In addition to the binders already present, the coating agent compositions for use in accordance with the invention may comprise further binders. These binders include, for example, typical coatings additives such as polysiloxane deaerating agents, glycidyl oxypropyltrimethoxysilane adhesion promoters, rheological additives such as thixotropic agents, and catalysts composed of amine, tin, diazabicyclooctane and/or zinc, zirconium, and aluminum compounds. The coating agent compositions for use in accordance with the invention may also comprises zeolite molecular sieves, which are included among the fillers.

With particular preference the coating agent compositions for use in accordance with the invention comprise catalysts composed of zirconium, tin and/or zinc complexes and/or bismuth salts and/or aluminum compounds which are capable of catalyzing the reaction between hydroxyl groups and isocyanate groups.

In another particularly preferred embodiment, the coating agent compositions for use in accordance with the invention, based on the total mass of the coating agent composition, comprise 0.05 to 0.15 wt %, preferably 0.08 to 0.10 wt %, of deaerating agents, 0.10 to 1.00 wt %, preferably 0.20 to 0.50 wt %, of adhesion promoters, 0.01 to 0.40 wt %, preferably 0.04 to 0.23 wt %, of rheological additives, 0.01 to 5.00 wt %, preferably 1.50 to 2.50 wt %, of molecular sieves, and 0.10 to 1.00 wt %, preferably 0.35 to 0.45%, of catalysts.

Inventive Use and Inventive Methods

In accordance with the invention the above-described coating agent composition is used for lining containers. Another subject of the present invention, accordingly, is a method for lining containers with the coating agent composition, and also a container lined correspondingly.

A container is considered for the purposes of the present invention, in accordance with the definition having general validity, to be an article which in its interior has a cavity and which serves the purpose of separating a product introduced for storage into this cavity from its environment. The wall of the container is preferably designed such that the container can also be used for storing liquids. Preferably, therefore, the wall is of closed design. Likewise preferably it is a rigid and stiff wall. Contact with the environment, particularly in order to allow the admission and emission of stored products, or cleaning, can be provided through sealable doors, valves, and lines. Such containers may also be under pressure and/or may be designed in such a way that they can be subjected to a pressure higher than atmospheric pressure.

The internal surface, the surface for coating, of the container is preferably a metallic substrate.

Examples of containers for preferred use are tanks, tankers, and tank cars.

In the context of the inventive use, the coating agent composition is preferably applied directly to the metallic substrate.

To produce a coating on the internal surface of a container, the coating agent composition of the invention is applied to the preferably metallic internal surface of the container, by means of spray application, for example. Typical wet film thicknesses are from 100 to 600 μm, preferably 150 to 450 μm.

The coating agent composition is applied preferably using a 2-component system in which the binder component A and the curing component B are supplied to the application unit separately. Mixing of the two components, A and B, takes place preferably only in the application unit. For this purpose, for example, an airless spray gun with integrated static mixer unit can be used. The coating agent composition of the invention is preferably applied at temperatures between 20 and 80° C. Application temperatures above the ambient temperature are realized by heating of the application unit and optionally by heating of the storage vessels.

Application of the coating agent composition for use in accordance with the invention to a substrate, in other words to the preferably metallic internal surface of a container, is followed by curing—that is, in particular, chemical crosslinking of the binder component A with the curing component B. The chemical crosslinking is carried out at temperatures of 15 to 60° C., preferably at 15 to 25° C.

On account of the high solids content of the coating agent compositions of the invention, the contraction of the coating agent composition on curing is considered to be negligible. The contraction is within the margin of error of the determination of the relevant film thicknesses. Film thickness determinations for the cured coating agent composition are carried out using a Qnix®8500 modular film-thickness measuring system.

It has emerged that after proper use of the linings thus produced, as for example after storage and/or transport of products such as liquid chemical products, the containers can be cleaned in a much-simplified way. The reason is that the lining produced as described above can be removed residuelessly from the internal surface of the container by simple peeling, optionally in combination with prior cutting of the lining. The term "peeling" in this context describes the residueless removal of a lining from a substrate by the action of a mechanical pulling force. In the case of this residueless removal, of course, there is also then removal of product residues located on the lining. Optionally, after the complete removal of the lining from the containers, rinsing with water may be carried out additionally, in order to remove final residues which are lying loosely in the container compartment and are in particular not strongly adhered to the internal surface.

A further subject of the present invention, accordingly, is a method for cleaning a container, which comprises the following steps:

(A) providing a container soiled with product residues of at least one product and having a lining of the invention, said lining having been produced prior to the filling of the container with a product, the container having been used for the storage and/or transport of at least one product,
and
(B) residuelessly removing the lining and also the product residues located on the lining.

The residueless removal of the lining and of the product residues located thereon takes place, as already indicated above, preferably by cutting of the ling and subsequent mechanical peeling of the lining.

The advantages of the inventive use and methods are manifested in particular in the case of products for storage and/or transportation that are liquid and that themselves, and/or their possibly degraded product residues, are thermally adhering and also difficult to detach from surfaces. Liquid products are those which are fluid under atmospheric pressure and at a temperature of 20° C., being, for example, highly mobile or not very runny—or of high viscosity. Accordingly, in the context of the present invention, the products are preferably liquid industrial products such as, in particular, chemical industrial products. Instances are paints, varnishes, lubricants, adhesives, glues, or oils such as crude oil, mineral oils, or silicone oils.

EXAMPLES

In the text below, the invention will be elucidated in more detail by examples.

Unless stated otherwise, figures in parts are parts by weight, and figures in percent are percentages by weight.

Production of Embodiments BM1 to BM9 of the Binder Component A, for Inventive Use:

TABLE 1

Composition of embodiments BM1 to BM3

| Binder component A | BM1 | BM2 | BM3 |
| --- | --- | --- | --- |
| Initial charge | | | |
| Propoxylated polyethylene glycol A1.1 | 13.75 | 13.75 | 13.75 |
| Formulation of propylene glycol A1.2 containing 20 wt % polyurethane urea A4 based on the formulation | 11.00 | 11.00 | 11.00 |
| 40 wt % silicone elastomer dispersion containing 40 wt % silicone elastomer particles A3 in propoxylated trimethylolpropane A1.3 | 10.00 | 20.00 | 10.00 |
| Modified polyamide thickener | 0.10 | 0.10 | 0.10 |
| Organically modified mineral thickener | 0.35 | 0.35 | 0.35 |
| Filler comprising chlorite, mica, and quartz | 5.50 | 5.50 | 5.50 |
| Molecular sieve as moisture scavenger | 4.00 | 4.00 | 4.00 |
| Propoxylated polyethylene glycol A1.1 | 20.00 | 10.00 | 16.00 |
| Organic catalyst | 0.28 | 0.28 | 0.28 |

TABLE 1-continued

Composition of embodiments BM1 to BM3

| Binder component A | BM1 | BM2 | BM3 |
| --- | --- | --- | --- |
| Accelerator 2 containing diazabicyclooctane and tris(dimethylaminopropylamine) | 0.24 | 0.24 | 0.24 |
| Metal complex catalyst based on zinc | 0.28 | 0.28 | 0.28 |
| Aromatic diamine A2 | 6.00 | 6.00 | 10.00 |
| Silicone-containing defoamer | 0.10 | 0.10 | 0.10 |
| Formulation of propylene glycol A1.2 containing 20 wt % polyurethane urea A4 based on the formulation | 26.00 | 26.00 | 26.00 |
| gamma-Glycidyloxypropyl-trimethoxysilane | 0.40 | 0.40 | 0.40 |
| Hollow microbeads | 2.00 | 2.00 | 2.00 |
| Total binder component A | 100.00 | 100.00 | 100.00 |

TABLE 2

Compositions of embodiments BM4 to BM6

| Binder component A | BM4 | BM5 | BM6 |
| --- | --- | --- | --- |
| Initial charge | | | |
| Propoxylated polyethylene glycol A1.1 | 13.75 | 13.75 | 13.75 |
| Formulation of propylene glycol A1.2 containing 20 wt % polyurethane urea A4 based on the formulation | 21.00 | 11.00 | 11.00 |
| 40 wt % silicone elastomer dispersion comprising 40 wt % silicone elastomer particles A3 in propoxylated trimethylolpropane A1.3 | 10.00 | 20.00 | 10.00 |
| Modified polyamide thickener | 0.10 | 0.10 | 0.10 |
| Organically modified mineral thickener | 0.35 | 0.35 | 0.35 |
| Filler comprising chlorite, mica, and quartz | 5.50 | 5.50 | 5.50 |
| Molecular sieve as moisture scavenger | 4.00 | 4.00 | 4.00 |
| Propoxylated polyethylene glycol A1.1 | 10.00 | 10.00 | 19.40 |
| Organic catalyst | 0.28 | 0.28 | 0.28 |
| Accelerator 2 containing diazabicyclooctane and tris(dimethylaminopropylamine) | 0.24 | 0.24 | 0.24 |
| Metal complex catalyst based on zinc | 0.28 | 0.28 | 0.28 |
| Aromatic diamine A2 | 6.00 | 6.00 | 10.00 |
| Silicone-containing defoamer | 0.10 | 0.10 | 0.10 |
| Formulation of propylene glycol A1.2 containing 20 wt % polyurethane urea A4 based on the formulation | 26.00 | 26.00 | 26.00 |
| gamma-Glycidyloxypropyl-trimethoxysilane | 0.40 | 0.40 | 1.00 |
| Hollow microbeads | 2.00 | 2.00 | 2.00 |
| Total binder component A | 100.00 | 100.00 | 100.00 |

TABLE 3

Composition of embodiments BM7 to BM9

| Binder component A | BM7 | BM8 | BM9 |
|---|---|---|---|
| Initial charge | | | |
| Propoxylated polyethylene glycol A1.1 | 13.75 | 13.75 | 13.75 |
| Formulation of propylene glycol A1.2 containing 20 wt % polyurethane urea A4 based on the formulation | 11.00 | 11.00 | 11.00 |
| 40 wt % silicone elastomer dispersion comprising 40 wt % silicone elastomer particles A3 in propoxylated trimethylolpropane A1.3 | 10.00 | 20.00 | 10.00 |
| Modified polyamide thickener | 0.10 | 0.10 | 0.10 |
| Organically modified mineral thickener | 0.35 | 0.35 | 0.35 |
| Filler comprising chlorite, mica, and quartz | 5.50 | 5.50 | 5.50 |
| Molecular sieve as moisture scavenger | 4.00 | 4.00 | 4.00 |
| Propoxylated polyethylene glycol A1.1 | 22.00 | 22.00 | 22.00 |
| Organic catalyst | 0.28 | 0.28 | 0.28 |
| Accelerator 2 containing diazabicyclooctane and tris(dimethylaminopropylamine) | 0.24 | 0.24 | 0.24 |
| Metal complex catalyst based on zinc | 0.28 | 0.28 | 0.28 |
| Aromatic diamine A2 | 6.00 | 6.00 | 10.00 |
| Silicone-containing defoamer | 0.10 | 0.10 | 0.10 |
| Formulation of propylene glycol A1.2 containing 20 wt % polyurethane urea A4 based on the formulation | 26.00 | 26.00 | 26.00 |
| gamma-Glycidyloxypropyl-trimethoxysilane | 0.40 | 0.40 | 0.40 |
| Total binder component A | 100.00 | 100.00 | 100.00 |

The binder components A are produced by first mixing the components listed under "Initial charge" as per Tables 1 to 3, in accordance with the sequence above. This is followed by dispersing to a temperature of 55° C. When this temperature is reached, all of the other components are added, with stirring. Following complete addition, stirring is continued for 15 minutes. After an aging time of at least 12 hours, the binder components are ready for use.

Production of Embodiments H1 to H3 of the Curing Component B, for Inventive Use:

TABLE 4

Composition of curing component B: H1 to H3

| Curing component B | H1 | H2 | H3 |
|---|---|---|---|
| Methylenedi (phenyl isocyanate) isomer mixture B1.2 and B2 | 70.62 | 62.62 | 81.62 |
| Poly(oxyalkylene glycol) from ethylene oxide/propylene oxide B1.1 | 28.4 | 36.4 | 18.4 |
| gamma-Glycidyloxypropy-trimethoxysilane | 0.5 | 1.0 | 0.8 |
| Pigment paste, black | 0.4 | | 0.4 |
| Pigment paste, yellow | | 0.6 | |
| Silicone-containing defoamer | 0.08 | 0.1 | 0.08 |
| Total curing component B | 100.00 | 100.00 | 100.00 |

The curing components B are produced by initially introducing the methylenedi(phenyl isocyanate) isomer mixture, the remaining components being added with stirring in the order stated. The subsequent reaction time is 1 to 12 hours.

Production of Coating Compositions C1 to C5 for Inventive Use:

The coating agent composition is produced by mixing 100 parts by weight of the binder component A with 40 parts by weight of the curing component B. Coating agent compositions produced were as follows: BM1 with H1 (C1), BM1 with H3 (C2), BM2 with H1 (C3), BM6 with H1 (C4), and BM7 with H2 (C5).

Production of Coatings and Investigation of These Coatings

In a laboratory experiment, coatings were produced on metal test panels and then investigated. These laboratory experiments serve as a good and sufficient form of modeling of the lining of containers, their contamination with product residues, and their cleaning.

To produce the coatings SC1 to SC5, the coating agent compositions C1 to C5 described above were coated onto both sides of unplated test panels made from aluminum alloy 2024, using a two-component high-pressure spraying system with thermally conditionable reservoir vessels and hose system. The dry film thickness was in the range from 250 to 450 μm. This thickness was ascertained 30 minutes after application. The coating was subsequently dried at 20° C. for 2 hours.

The coatings produced accordingly were coated in turn with different wood glues for the bonding of chipboard, based on aqueous solutions of amino resins, and were left to stand for a number of hours. The result in each case was a coated metal test panel contaminated with partly solidified, partly highly viscous product.

The coating on the metal panel and contaminated with product residues was subsequently cut into with a blade, and levered up partly in order to form coating sections which can be gripped by hand. The coating was then peeled from the metal surface. This peeling was accomplished without residue and without great application of force. The fully exposed metallic substrate, moreover, exhibited no instances of product contamination at all, this being synonymous with good chemical resistance of the coating prior to exposure to the applied product.

The invention claimed is:

1. A method of lining a container having an internal surface, the method comprising applying a coating agent composition comprising solids to the internal surface of the container and subsequently curing the coating agent composition, the coating agent composition comprising
   (i) at least one binder component A and
   (ii) at least one curing component B,
wherein
   the at least one binder component A comprises
      A1 at least one polyol component comprising at least one poly(oxyalkylene) glycol,
      A2 at least one aromatic diamine,
      A3 silicone elastomer particles, and
      A4 at least one polyurethane urea,
   and the at least one curing component B comprises
      B1 at least one urethane group-containing component comprising nonblocked isocyanate groups and
      B2 at least one aromatic diisocyanate from methylenedi (phenyl isocyanate),
the curing component B having an amount of nonblocked isocyanate groups of 10 to 30 wt %, and
the solids content of the coating agent composition is greater than 95 wt %.

2. The method according to claim 1, wherein the coating agent composition comprises
component A1 in an amount of 8 to 76 wt %,
component A2 in an amount of 1 to 8 wt %,
component A3 in an amount of 0.2 to 9 wt %,
component A4 in an amount of 0.5 to 11 wt %, and
the curing component B in an amount of 20 to 40 wt %,
each based on the total weight of the coating agent composition.

3. The method according to claim 1, wherein the polyol component A1 comprises at least one poly(oxyalkylene) glycol from ethylene oxide and/or propylene oxide.

4. The method according to claim 3, wherein the polyol component A1 comprises at least one propoxylated polyethylene glycol, at least one polypropylene glycol, and at least one propoxylated trimethylolpropane.

5. The method according to claim 1, wherein the urethane group-containing component B1 is prepared by reaction of a hydroxyl group-containing component B1.1 with an isocyanate component B1.2, the hydroxyl group-containing component B1.1 being at least one $C_1$-$C_6$-alkoxylated poly(oxyalkylene) glycol, the isocyanate component B1.2 being an aromatic diisocyanate from methylenedi(phenyl isocyanate), and the ratio of the OH groups of component B1.1 to the NCO groups of isocyanate component B1.2 being in a range from 1:1.05 to 1:2.05.

6. The method according to claim 1, wherein the fraction of component B2, based on the curing component B, is from 40 to 60 wt %.

7. The method according to claim 1, wherein the aromatic diamine A2 is a monocyclic aromatic.

8. The method according to claim 1, wherein the coating agent composition is applied by spray application in a wet film thickness of 100 to 600 µm and subsequently cured by chemical crosslinking in a temperature range from 15 to 60° C.

9. The method according to claim 8, wherein the internal surface of the container is a metallic substrate.

10. The method according to claim 8, wherein the container is a tank, tanker, or tank car.

11. A container lined with a coating produced by the method according to claim 8.

12. A method for cleaning a container, the method comprising,
(A) providing a container soiled with product residues of at least one product and having a lining produced according to claim 8, said lining having been produced prior to the container being filled with a product, the container having been used for storage and/or transport of at least one product, and
(B) residuelessly removing the lining and also the product residues located on the lining.

13. The method according to claim 12, wherein the residue less removal of the lining and of the product residues located thereon is accomplished by cutting into the lining and then subsequently mechanically peeling off the lining.

14. The method according to claim 12, wherein the at least one product is a liquid industrial product selected from the group consisting of paints, varnishes, lubricants, adhesives, glues, and oils.

15. The method according to claim 14, wherein the at least one product is an oil selected from the group consisting of crude oil, mineral oils, and silicone oils.

* * * * *